United States Patent
Flottmann et al.

[11] Patent Number: 5,378,135
[45] Date of Patent: Jan. 3, 1995

[54] APPARATUS FOR ALIGNING THE CUTTING SURFACES OF CUTTING BLADES OF A GRANULATING DEVICE

[75] Inventors: Willi Flottmann, Wendelstein; Siegfried Kuklinski, Stuttgart, both of Germany

[73] Assignee: Werner & Pfleiderer GmbH, Stuttgart, Germany

[21] Appl. No.: 78,612

[22] Filed: Jun. 17, 1993

[30] Foreign Application Priority Data

Jul. 2, 1992 [DE] Germany .................... 4221776

[51] Int. Cl.⁶ .................................... B29C 37/00
[52] U.S. Cl. .................... 425/168; 425/196; 425/313; 425/DIG. 230
[58] Field of Search ............ 51/161, 154, 288; 83/174; 425/67, 168, 196, 311, 313, DIG. 230; 264/142

[56] References Cited

U.S. PATENT DOCUMENTS

| | | | |
|---|---|---|---|
| 1,129,059 | 2/1915 | Bates | 51/161 |
| 3,343,213 | 9/1967 | Fritsch | 425/313 |
| 3,665,658 | 5/1972 | Warwick | 51/288 |
| 4,182,084 | 1/1980 | Friedenberg | 51/161 |
| 4,285,169 | 8/1981 | Franklin | 51/288 |
| 4,728,275 | 3/1988 | DiLullo et al. | 425/67 |

FOREIGN PATENT DOCUMENTS

| | | |
|---|---|---|
| 1918439 | 6/1965 | Germany . |
| 2646309 | 2/1980 | Germany . |

*Primary Examiner*—Jay H. Woo
*Assistant Examiner*—Robert B. Davis
*Attorney, Agent, or Firm*—Ladas & Parry

[57] ABSTRACT

A process and apparatus for aligning the cutting surfaces of cutting blades of a granulating device, in which an abrasive plate is detachably connected to the granulating hood of the granulating device after disconnection of the hood from a die plate. The abrasive plate remains fixed and the cutting surfaces of the cutting blades are ground by rotating the cutting head so that the cutting surfaces will be aligned axially on the axis of rotation of the drive shaft of the cutting head and located in a common plane perpendicular to the axis of rotation. The grinding operation for alignment can be carried out in situ on the granulating device, or the granulating hood and cutting head can be removed from the granulating device and the grinding and alignment can be effected in a separate support.

17 Claims, 2 Drawing Sheets

APPARATUS FOR ALIGNING THE CUTTING SURFACES OF CUTTING BLADES OF A GRANULATING DEVICE

FIELD OF THE INVENTION

The invention relates to a process and apparatus for the alignment and adjustment of the cutting surfaces of cutting blades of a cutting head of a granulating device for thermoplastic materials.

BACKGROUND AND PRIOR ART

Granulating devices for thermoplastic materials having cutting blades on a cutting head are disclosed in DE-PS 14 54 888 and DE-PS 26 46 309.

In these granulating devices, an alignment of the cutting surfaces of the cutting blades in the cutting head is conducted prior to the actual granulating process by installing the cutting head so that the cutting blades are under slight pressure against the front face of the die plate attached to the granulating head of an extruder.

In this way, the cutting blades are brought in totality into exact alignment on the precision surface of the die plate and any deviations due to tolerances or the like are taken up. This is necessary in order to obtain a satisfactory granulate of uniform grain size.

The same initial conditions can be achieved in the same way after changing individual cutting blades in order to prevent changes in the quality of the granulate over a period of time of operation of the granulating device.

In order to prevent retraction of the cutting blades under the pressure produced by their alignment, the cutting blades are attached to the cutting head at a slight angle of incidence. Since the cutting blades can be removed individually, they can be reground at any time for a separate adjustment and future use. However, this is in fact only of conditional advantage since the new adjustment of the cutting blade after it is attached to the cutting head in a position of alignment with the die plate, a so called "cutting-in" operation, is very time consuming and requires a shutdown of several hours of granulate production.

SUMMARY OF THE INVENTION

An object of the invention is to provide a process and apparatus which overcomes the disadvantages associated with installation and replacement of the cutting blades by providing simple and precise adaptation of the cutting blades to the surface of the die plate.

In accordance with the invention, an abrasive plate is detachably mounted in facing relation with the cutting surfaces of the cutting blades, and the cutting head which supports the cutting blades is driven in rotation to grind the cutting surfaces of the blades on an abrasive surface of the abrasive plate. Thereby, the cutting surfaces are aligned in a transverse plane perpendicular to the axis of rotation of the cutting head.

It has been surprisingly found, unlike the use of friction pressure in the known art, that alignment according to the invention, can be effected in a very precise way, by the separate and stationary abrasive plate.

The individual paths of travel of the individual cutting blades on the cutting head, are made to coincide in a common plane not by force, but by slight grinding of the cutting surfaces of the blades. The alignment process is reduced to approximately 12 minutes and in addition, the expensive die plate is separated from the grinding operation and not subject to damage.

The alignment of the cutting blades can be carried out separately from the granulating device and thus one or more cutting heads can be kept in a readiness state for replacing a used cutting head, whose blade surfaces come out of planar alignment. Except for the mounting operations, there are no time consuming measures for adapting the cutting blades to the die plate.

In a particular embodiment of the invention, the abrasive plate comprises a base plate on which is mounted an annular ring having an abrasive surface facing the cutting surfaces of the blades. Preferably the abrasive surface comprises a layer coated with diamond chips.

According to a feature of the invention, the abrasive surface of the abrasive plate is adjustable relative to the cutting blades for accurate and controllable alignment of the cutting surfaces of the cutting blades. The degree of engagement between the cutting blades and the die plate that exists in the actual granulating device can be simulated in a simple way.

According to another embodiment of the invention, the cutting surfaces of the blades are ground and aligned while the cutting head, its drive means and the granulating hood remain in the granulating device. To achieve this, the granulating hood is disconnected from the die plate and the assembly of the cutting head, its drive means and the granulating hood is displaced away from the die plate. The abrasive plate is then detachably connected to the granulating hood and adjustment of the surfaces of the cutting blades is effected utilizing the actual drive means of the cutting head. In this embodiment in which the alignment of the cutting surfaces is effected essentially in situ, the fine adjustment of the cutting surfaces is effected by a very sensitive movement of the cutting head as normally provided in the granulating device. When the grinding and alignment operation is carried out, the die plate is separated and is not subject to damage.

DETAILED DESCRIPTION OF PREFERRED EMBODIMENTS

Figure 1:
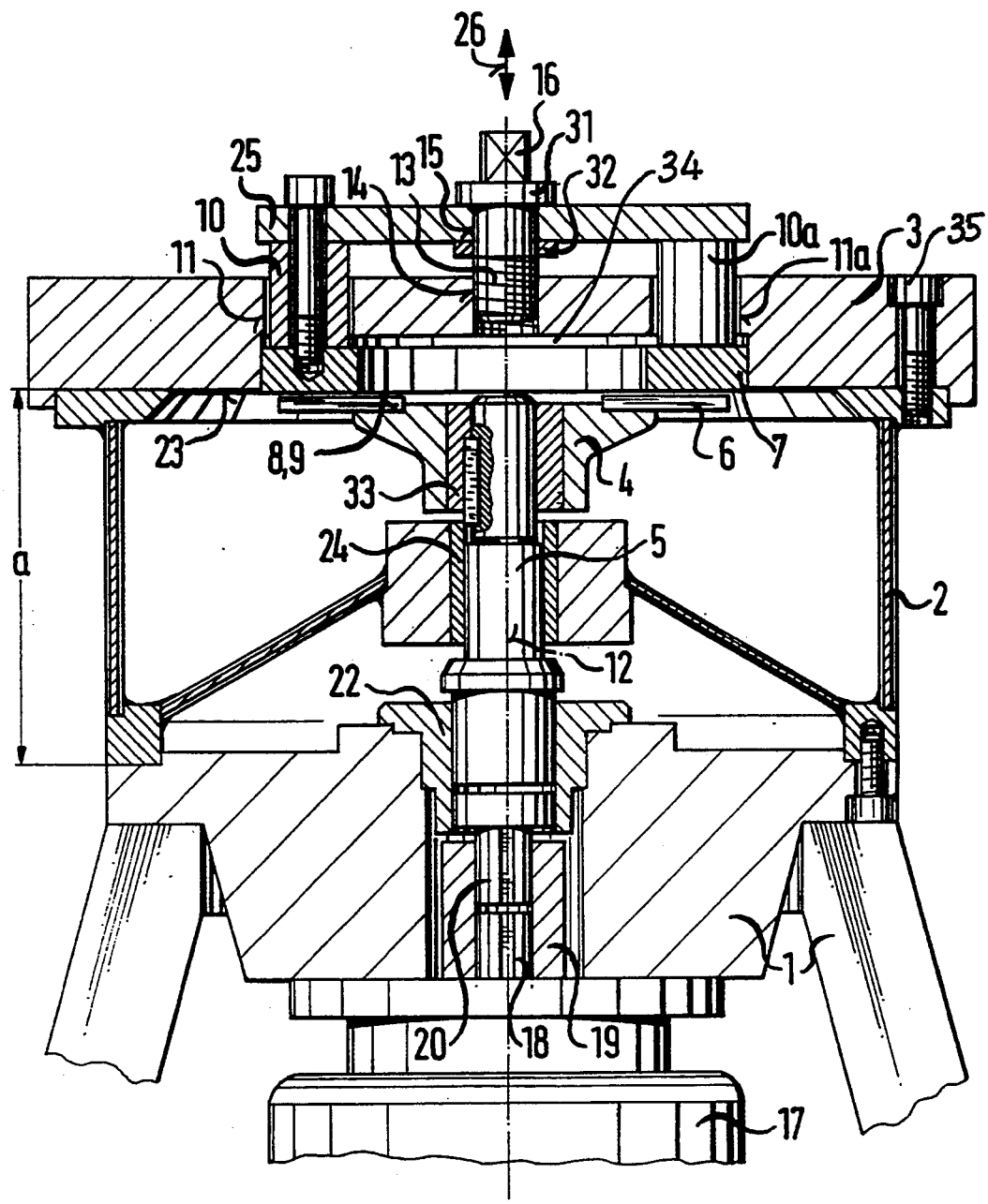
FIG. 1 is a longitudinal sectional view, of an embodiment of a device for receiving a cutting head of a granulating device, to grind the cutting surfaces of cutting blades in said head.
Figure 2:
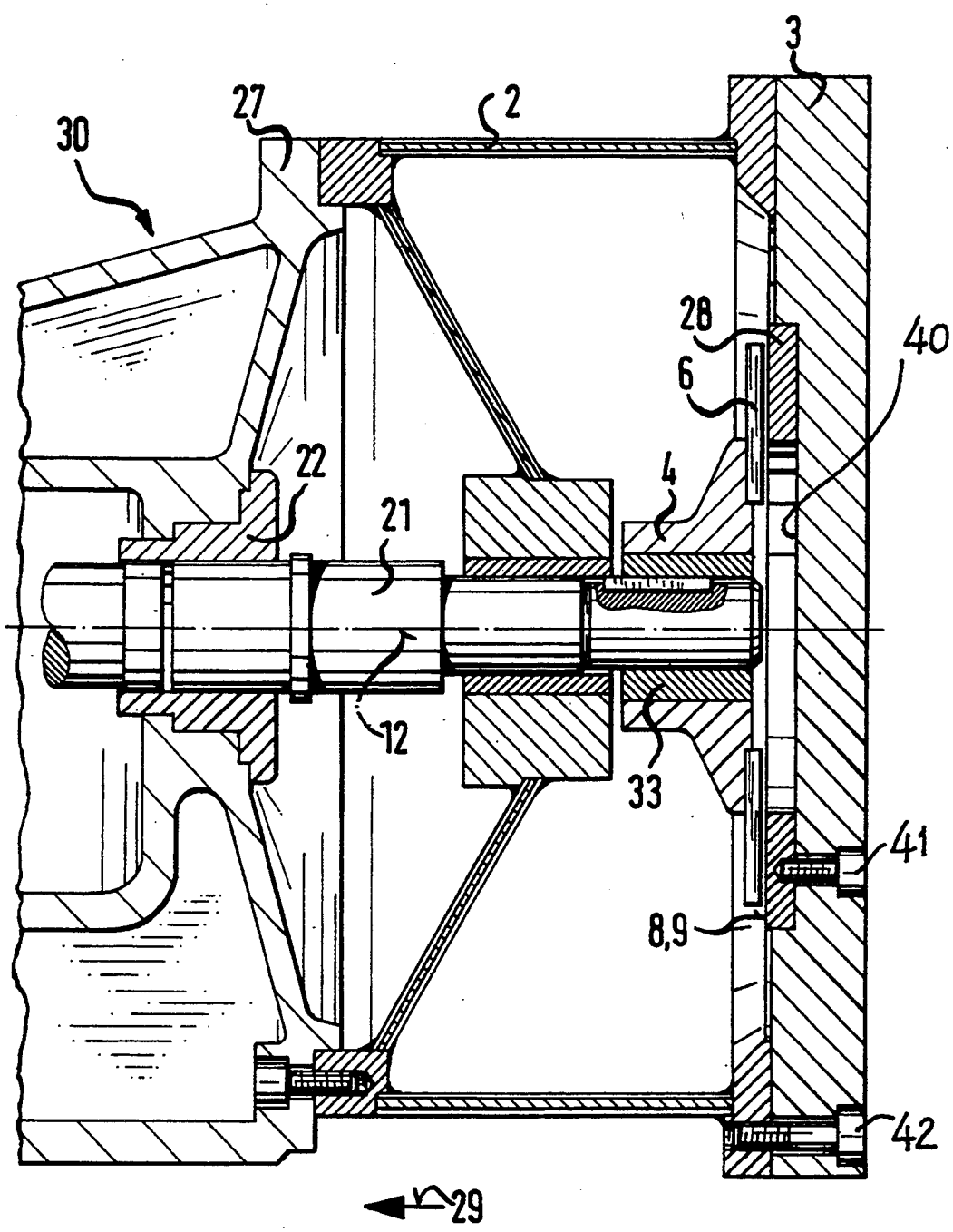
FIG. 2 is a longitudinal sectional view of a granulating and cutting head of a granulating device cooperating with an abrasive plate to grind the cutting surfaces of cutting blades in said head.

FIG. 1, illustrates a support 1 which supports a granulating hood 2 and a cutting head 4 of a granulating device. An abrasive plate 3 is detachably connected to hood 2. The granulating device is well known in the art and serves for the underwater granulation of thermoplastic material. Referring to FIG. 2, which shows a portion of the granulating device, a cutting unit 30 is connected to hood 2, the cutting unit having a drive means (not shown) for driving cutting head 4 in rotation about an axis of rotation 12. A die plate (not shown) of a granulating head is normally detachably connected in fixed state on hood 2 to face cutting blades 6 of cutting head 4. In operation, strands of thermoplastic material are discharged through openings in a precision ground surface of the die plate facing the cutting surfaces of the cutting blades 6. By the rotation of the cutting head 4, the cutting blades 6 cut the strands of thermoplastic material into granules in the granulating hood 2, which is filled with water or other liquid. The granules are removed from the hood 2 for further treatment. The cutting head is detachably connected to the die plate and when disconnected from the die plate, the cutting unit 30 and granulating hood 2 are movable as a unit for axial travel relative to the die plate.

Returning to FIG. 1, therein it is seen that the granulating hood 2 and the cutting head 4 and its drive shaft 5 have been separated from the granulating device and installed in the support 1. The abrasive plate 3 has been mounted on the granulating hood 2 by bolts 35 in a position in which the abrasive plate 3, the granulating hood 2 and the cutting head 4 are coaxially arranged around axis of rotation 12 of shaft 5. The support 1, granulating hood 2 and abrasive plate 3 are arranged in this order coaxially along the axis 12. The shaft 5 carrying the cutting head 4 is rotatably supported in granulating hood 2 by friction bearing 24 and in support 1 by thrust bearing 22. The cutting head 4 is mounted on shaft 5, by an elastic metal bushing 33, in a position in which the cutting surfaces of cutting blades 6 face an abrasive ring 7, supported in abrasive plate 3 in coaxial arrangement on axis 12. The ring 7 is supported in abrasive plate 3 with capability of relative axial movement in plate 3. The abrasive ring 7 has an annular surface 8, with an abrasive layer 9 thereon, facing the cutting surfaces of cutting blades 6. The abrasive layer 9, contains diamond chips or the like as the abrasive material.

Precision axial adjustment of ring 7 is obtained by the construction shown in FIG. 1, wherein pins 10 are threadably secured to ring 7 and are loosely and guidably fitted in a crosspiece 25 and in spacers 10a interposed between ring 7 and crosspiece 25, the spacers 10a being disposed in bores 11 in abrasive plate 3 with clearance as show at 11a. A bolt 13 is engaged in a threaded bore 14 in abrasive plate 3 and the bolt 13 is rotatably secured in an axially fixed position on crosspiece 25 by an annular collar 31 on bolt 13 and a locking ring 32. An external head 16 on the bolt 13, can be turned by a wrench or the like to axially adjust the position of the ring 7 axially in a recess 34 in a plate 3, by moving the ring 7 in the directions of arrows 26, depending on the direction of rotation of the bolt 13. In this way a very precise adjustment of the ring 7 can be made, as measured by a measuring device (not shown), which can be a simple gauge for measuring the distance between the plate 3 and the crosspiece 25.

In order to establish the precise position of the cutting surfaces of the blades 6, axially along axis 12 and in a common transverse plane perpendicular to axis 12, after the axial adjustment of ring 7, the cutting head is driven in rotation by a drive motor 17, to grind the cutting surfaces of the blades 6 by the abrasive layer 9 of the ring 7. The drive motor 17, has a drive shaft 18 connected by a coupling 19 to a shaft end 20 of shaft 5.

Instead of mounting the abrasive plate 3, on granulating hood 2 of an actual granulating device, the abrasive plate 3 can be mounted on a dummy hood, having a length "a" between benchmark mounting surfaces thereon for support 1 and abrasive plate 3, corresponding to the length of hood 2.

Since the cutting surfaces of the cutting blades 6 have been ground and aligned when separated from the granulating device, the assembly of the granulating hood 2 and the cutting head 4 can be held in readiness for replacing the same unit in a granulating device whose cutting surfaces have come out of alignment.

In FIG. 2, the grinding and alignment of the cutting surfaces of the cutting blades is effected with the granulating hood 2 and cutting head 4 retained in the granulating device. The same elements in FIG. 2 as in FIG. 1 are given the same reference characters. In FIG. 2, the granulating head 2 is disconnected from the die plate (not shown) of the granulating head (also not shown) and the assembly consisting of the cutting unit 30 and granulating hood 2 is moved axially to the left in the direction of arrow 29. The abrasive plate 3, with abrasive ring 28 detachably fixed in a recess 40 in plate 3 by bolts 41, is detachably connected to the hood 2 by bolts 42 in a fixed state. The hood 2 is fixed to housing 27 of cutting unit 30. The ring 28 is coaxial with the axis of rotation 12 and its abrasive layer 9 is at a short distance from cutting blades 6. Shaft 21 is mounted in housing 27 in the same way as the shaft 5 in support 1 in FIG. 1, namely by thrust bearing 22.

Cutting head 4 of cutting unit 30 is lightly held by means of spring tension of the elastic metal bushing 33 and the head 4 is adjusted in a very sensitive manner against abrasive layer 9 of ring 28 by means of a conventional fine stroke adjustment for shaft 21 provided in cutting unit 30 of the granulating device itself. Since shaft 21 is joined with its drive motor (not shown in FIG. 2) for the granulating of the thermoplastic material, the cutting head 4 can be rotated to grind the cutting surfaces of the cutting blades 6 to achieve a correct axial position and concentricity of its cutting surfaces.

After termination of this alignment of the cutting surfaces of cutting blades 6, which lasts 5 to 20 minutes, the abrasive plate 3 with its ring 28 is removed from granulating hood 2 and the cutting unit 30 is moved back towards the granulating head in the direction opposite the arrow 29 to the die plate of the granulating head. The granulating hood is then detachably reattached to the die plate and the granulating device is now ready for renewed operation.

In this way, even for resharpening individual cutting blades 6, the cutting head 4 and its cutting blades 6 can be aligned geometrically accurately in a very short period of time, while the expensive precision die plate is out of the way and hence not subject to damage.

Although the invention has been described in conjunction with specific embodiments thereof, it will become apparent to those skilled in the art that numerous modifications and variations can be made without departing from the scope and spirit of the invention as defined in the attached claims.

What is claimed is:

1. Apparatus for adjusting and aligning the cutting surfaces of cutting blades of a granulating device for thermoplastic material, said apparatus comprising:
a granulating hood,
a rotatable cutting head in said granulating hood, said cutting head including cutting blades having cutting surfaces,
drive means for driving said cutting head in rotation, and
an abrasive plate detachably mounted in facing relation to said cutting blades, said abrasive plate having an abrasive surface facing said cutting surfaces of said cutting blades for grinding said cutting surfaces upon rotation of said cutting head to adjust and align said cutting surfaces longitudinally along an axis of rotation of said cutting head and in a transverse plane perpendicular to said axis of rotation, said abrasive plate comprising a base plate detachably mounted on said granulating hood, said base plate having an annular recess therein coaxial with said axis of rotation and a ring in said recess secured to said base plate concentrically on said axis of rotation, said abrasive surface being on said ring.

2. Apparatus as claimed in claim 1, wherein said base plate is detachably mounted in fixed position on said granulating hood.

3. Apparatus as claimed in claim 2, wherein said ring is detachably mounted in said recess in said base plate.

4. Apparatus as claimed in claim 1, wherein said abrasive surface includes diamond chips.

5. Apparatus as claimed in claim 1, further comprising means on said base plate for adjusting the ring relative to the cutting surfaces of the cutting blades along said axis of rotation.

6. Apparatus as claimed in claim 5, wherein said means for adjusting said ring comprises a turnable member which upon turning moves the ring axially relative to the cutting surfaces of the cutting blades.

7. Apparatus as claimed in claim 6, wherein said means for adjusting said ring further comprises a crosspiece, means connecting said crosspiece to said ring for common movement along said axis of rotation, and means connected to said base plate for displacing said crosspiece and thereby said ring along said axis of rotation.

8. Apparatus as claimed in claim 7, wherein said means connecting said crosspiece to said ring comprises pins on said crosspiece secured to said ring to permit displacement of said ring along said axis of rotation, and said means for displacing said crosspiece comprises a bolt threaded in said base plate and engaging said crosspiece to displace said crosspiece and said ring upon rotation of said bolt.

9. Apparatus as claimed in claim 8, wherein said bolt includes an external head for rotating said bolt.

10. Apparatus as claimed in claim 1, wherein said drive means, said granulating hood and said abrasive plate are axially arranged one after the other in this order.

11. Apparatus as claimed in claim 1, comprising a separate support supporting said drive means and said granulating hood when separated from said granulating device.

12. Apparatus as claimed in claim 11, wherein said granulating hood is a dummy hood.

13. An apparatus as claimed in claim 1, wherein said granulating hood includes means for rotatably supporting said rotatable cutting head in said granulating hood.

14. Apparatus as claimed in claim 13, wherein said drive means comprises a rotatable drive shaft on which said cutting head is mounted for rotation together with said shaft around said axis of rotation, said means for rotatably supporting said rotatable cutting head in said granulating hood comprising a friction bearing between said granulating hood and said drive shaft.

15. Apparatus as claimed in claim 2, wherein said base plate has a surface which abuts against a surface of said granulating hood to position said base plate and said abrasive surface of the ring precisely relative to said cutting blades.

16. Apparatus as claimed in claim 15, wherein the surfaces of the base plate and the granulating hood which abut each other are disposed substantially perpendicularly to said axis of rotation.

17. Apparatus as claimed in claim 1, wherein said base plate axially abuts against an end surface of said granulating hood and said abrasive surface of said annular ring is positioned to face said cutting surfaces of said cutting blades.

* * * * *